(12) United States Patent
McGlinchy et al.

(10) Patent No.: US 7,273,406 B2
(45) Date of Patent: Sep. 25, 2007

(54) GLASS TREATMENT SYSTEM AND METHOD

(75) Inventors: Timothy B. McGlinchy, Twinsburg, OH (US); Stephen M. Bills, Cuyahoga Falls, OH (US); Paul A. Hofener, Parma, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 245 days.

(21) Appl. No.: 11/111,146

(22) Filed: Apr. 21, 2005

(65) Prior Publication Data

US 2006/0236840 A1   Oct. 26, 2006

(51) Int. Cl.
*B24B 49/00* (2006.01)
(52) U.S. Cl. .................. 451/5; 451/9; 451/54; 451/231
(58) Field of Classification Search .................. 451/5, 451/8–12, 67, 69, 70, 54, 231, 237, 292; 225/2, 3
See application file for complete search history.

(56) References Cited

U.S. PATENT DOCUMENTS

| 5,325,635 | A | * | 7/1994 | Ikola et al. ..................... 451/5 |
| 5,449,312 | A | | 9/1995 | Lisec |
| 5,622,540 | A | * | 4/1997 | Stevens ....................... 65/112 |
| 6,461,223 | B1 | * | 10/2002 | Bando ......................... 451/12 |
| 2002/0004355 | A1 | * | 1/2002 | Bando ........................... 451/5 |

\* cited by examiner

*Primary Examiner*—Dung Van Nguyen
(74) *Attorney, Agent, or Firm*—Tarolli, Sundheim, Covell & Tummino LLP

(57) ABSTRACT

A system for abrading and scoring glass. An abrading/scoring station includes a table for supporting a large sheet of glass on a generally flat support. A first tool support moves an abrading tool for abrading a coating material from the glass. A second tool support moves a scoring or cutting tool that scores a region of the glass. By coordinating a movement of the first and second tool supports with respect to a piece of glass, a controller causes the respective tools to first abrade and then score controlled paths on the piece of glass while avoiding contact between the first and second tool supports and their respective tools.

37 Claims, 11 Drawing Sheets

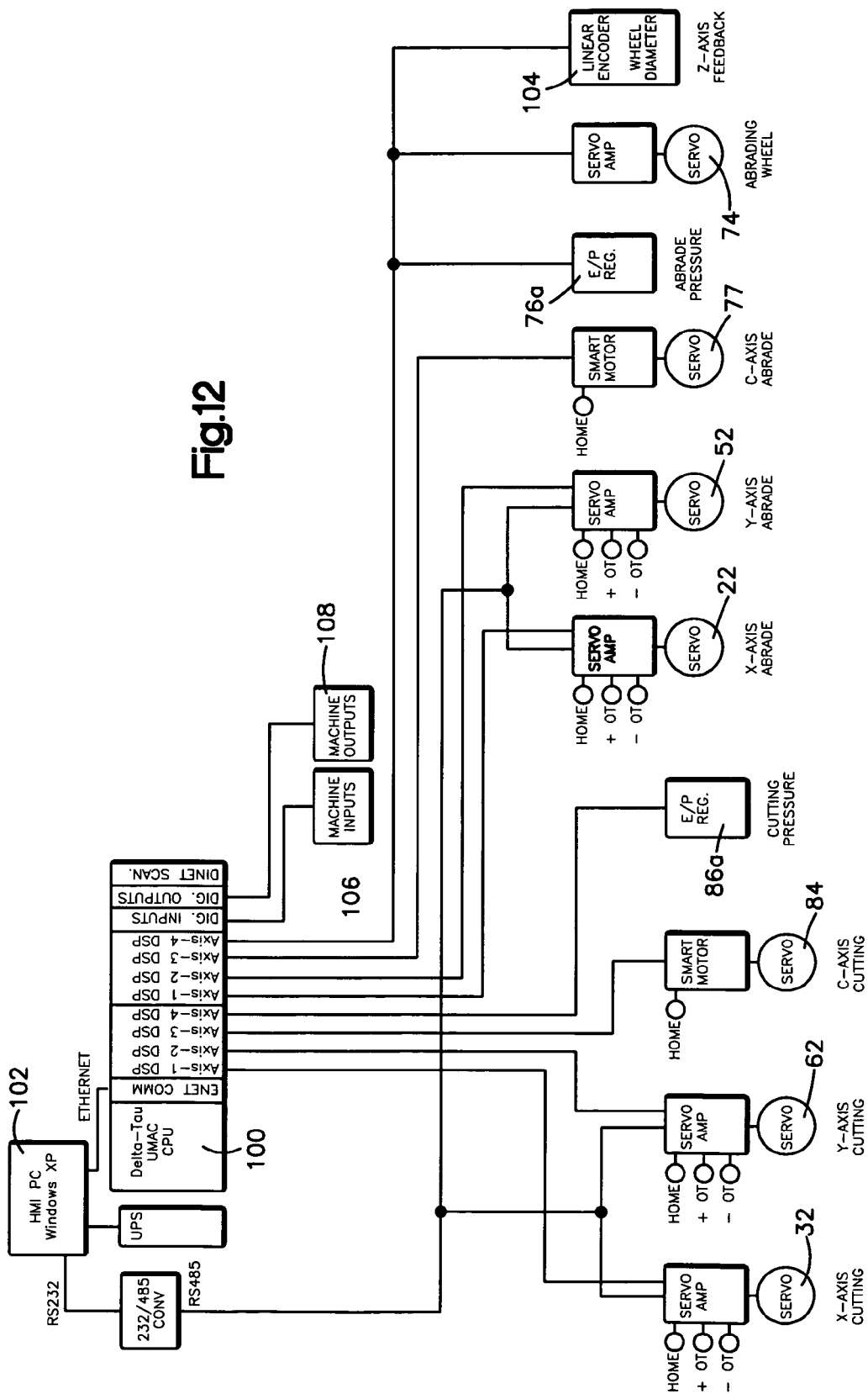

GLASS TREATMENT SYSTEM AND METHOD

FIELD OF THE INVENTION

The present invention concerns a system and method for treating glass and more particularly to a system that scores glass sheets along controlled paths after removing a coating material that has been applied to the glass during its fabrication.

BACKGROUND ART

It is known in the window and door fabrication industry to treat large glass sheets for use in the fabrication of windows and doors with a material that provides specified light transmission or reflection properties. One common treatment applies a layer of material uniformly across a glass sheet to provide lower radiation transmissivity. When such glass is used in fabricating a insulating glass unit (IGU) having multiple spaced apart lites, the low transmissivity layer can be located on an outside of the glass unit to lower the tendency of the sun's radiation to heat a building interior. On other insulating glass units, the low transmissive layer can be placed on the inside of the IGU to reduce the amount of heat radiation exiting the building. In known applications, a silver containing compound is uniformly applied to a surface of glass sheets from which IGU lites (or panes) are cut to achieve such properties.

Experience with fabricating window or door lites from large sheets of glass indicate it is preferable to remove radiation reflecting or transmitting material before scoring the glass for breakout into smaller pane sized lites. If these coatings are not first removed, the glass tends to break, chip or otherwise become damaged in the region of the glass scoring. If the coating is removed at a processing station downstream from the cutting station, the probability of damage is increased due to handling of the glass sheets. The coating is removed in a region of the glass to which sealant is applied to promote adhesion properties of the sealant.

One prior art patent that addresses the problems of removing such coating material is U.S. Pat. No. 5,449,312 to Lisec. This patent discloses a process for simplifying the cutting of a glass sheet with the help of a cutting tool and the removal of a coating applied on a glass sheet with the help of a grinding tool.

SUMMARY OF THE INVENTION

One exemplary system supports a large sheet of glass on a glass support at a glass scoring station. A programmable control positions a first tool support for controlled movement above the flat support. A second tool support is also positioned for controlled movement above the flat support. One support carries an abrading tool that abrades a coating material from the glass and a second support carries a scoring tool that scores a region of the glass that has been abraded. By coordinating a movement of the first and second tool supports with respect to a piece of glass and controlled actuation of the tools (abrading and cutting) the system both abrades and scores controlled paths on the piece of glass while avoiding contact or collisions between the first and second tool supports or their respective tools.

A more specific embodiment of the disclosed system abrades a glass sheet along one or more paths to remove a material from the glass sheet. Abrading is allowed without scoring or cutting until a minimum separation between a cutting tool and an abrading tool is achieved. After this minimum separation is achieved, the abrading tool continues to remove material from additional paths simultaneous with operation of the cutting tool which scores along a previously abraded path.

The exemplary system achieves controlled scoring at rates that make the system very efficient. These and other aspects and features of the invention will become better understood by reference to the detailed description of an exemplary embodiment which is described in conjunction with the accompanying drawings.

BRIEF DESCRIPTION OF THE DRAWINGS

FIG. 12 is a schematic of an exemplary system depicting motors and a controller used with the exemplary system.

EXEMPLARY MODEM FOR PRACTICING THE INVENTION

Figure 1:
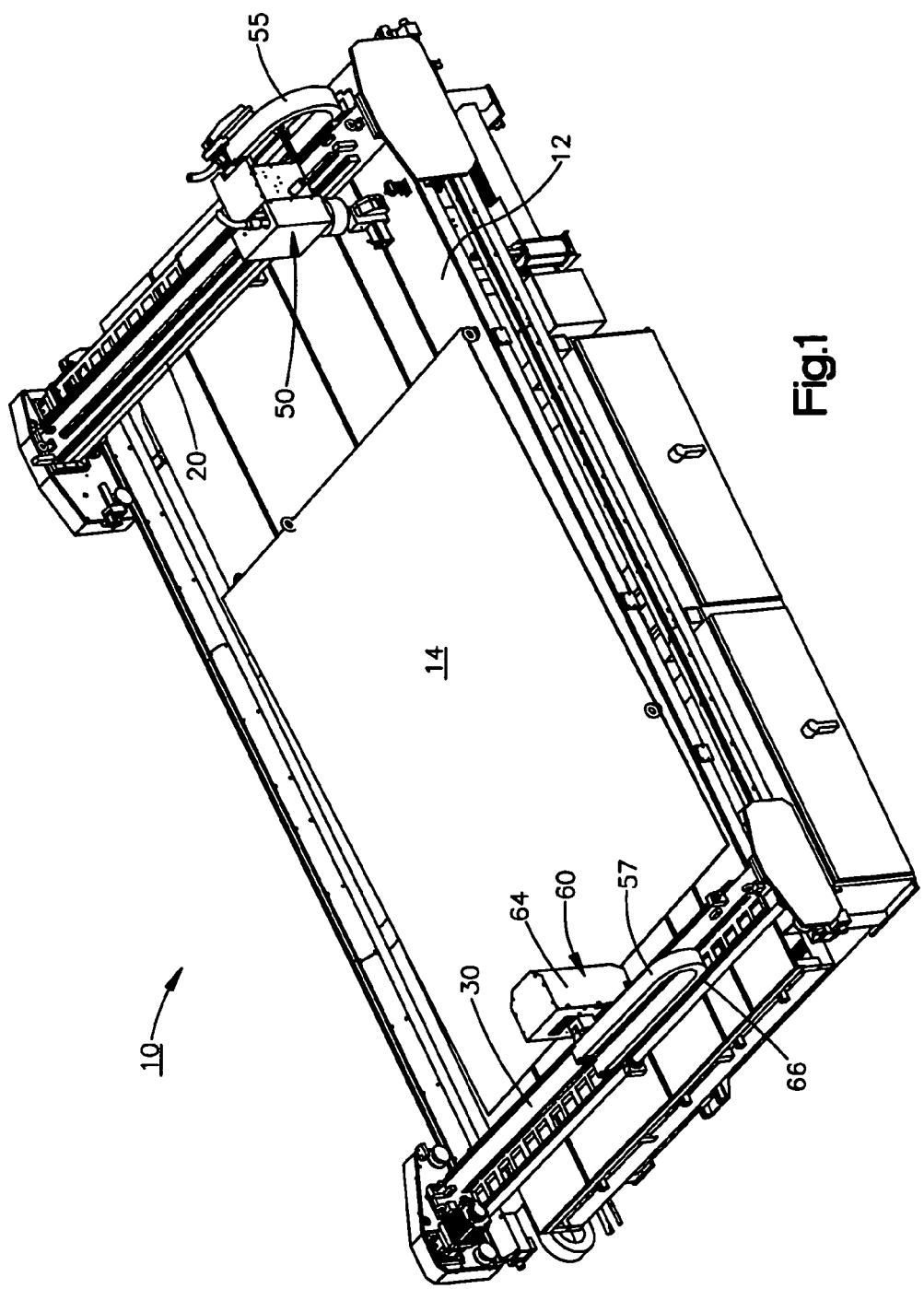
FIG. 1 is a perspective view of an exemplary system for abrading and scoring flat sheets of glass.
Figure 2:
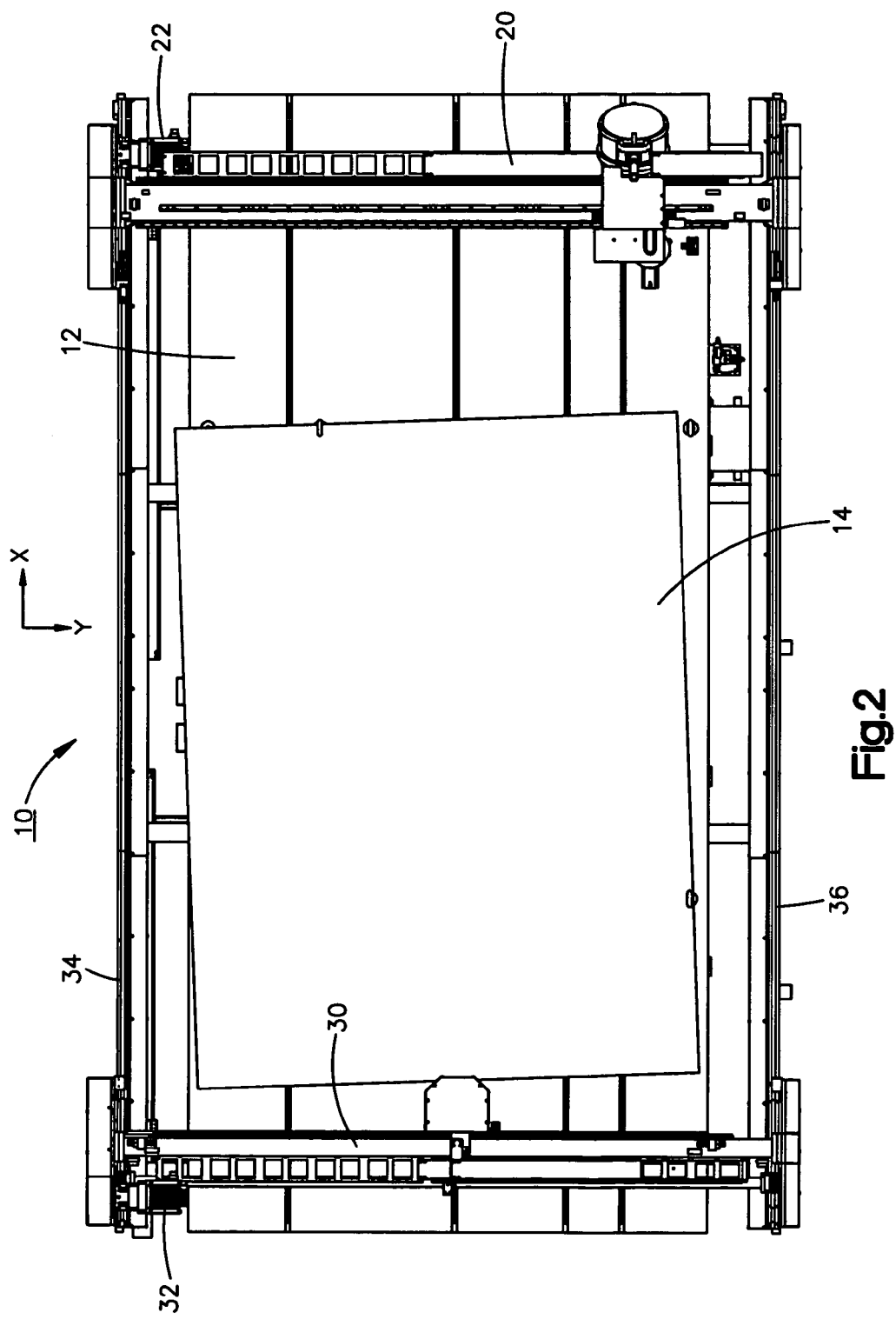
FIG. 2 is a top plan view of the system of FIG. 1.
Figure 3:
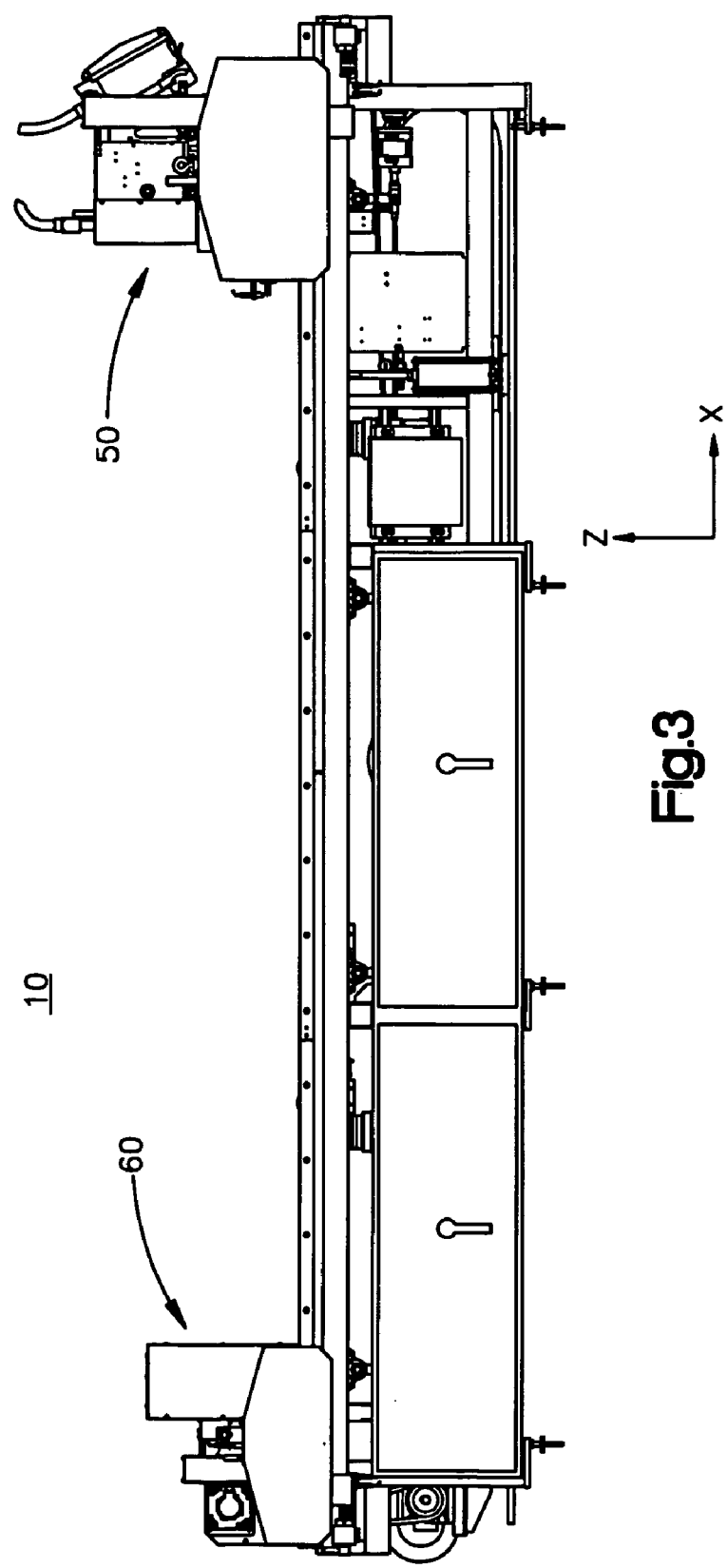
FIG. 3 is a side elevation view of the system of FIG. 1.

An exemplary system for abrading and scoring glass is depicted in the Figures. As seen in FIGS. 1-3 the exemplary system defines an abrading/cutting station 10 that includes a generally flat support or table 12 for supporting a large sheet 14 of glass at the cutting station 10. The exemplary system can either lay the sheet on the table automatically or it can be placed manually. Although much of the discussion relating to the exemplary embodiment concerns abrading away a material before the scoring operation takes place, those skilled in the art will appreciate that if the glass is not coated with a light transmissive or reflective coating only scoring occurs at the station 10. Also, there are regions that are only abraded, for example, regions where an adhesive material is applied to a lite cut from the sheet 14 to secure the lite to an IGU spacer frame. Once the large sheet is cut or scored it is typically moved to another station for break out of individual lites for fabrication into an insulated glass unit (IGU). Insulated glass units are described in a number of prior art patents and are well known in the window manufacturing art.

A first tool support or bridge 20 extends across the flat support or table 12 and is moved relative to the table in an 'x' direction (See coordinate axes of FIGS. 2 and 3) by a drive motor 22. The motor 22 is coupled to a controller 100 (FIG. 12) that energizes the motor 22 to move the first tool bridge 20 back and forth in the x direction relative the glass sheet 14 resting on the flat support. No squaring or physical ordinate referencing of the flat sheet of glass is required. Physical alignment through use of blocks or wheels is not needed. As the glass sheet is first placed on the table, the orientation of the sheet is sensed by optical sensors (not shown) and as discussed below, the orientation is taken into account as glass lites are abraded and scored. A second tool support or bridge 30 also extends across the flat support 12 and is moved relative to the table by a drive motor 32.

The motors 22, 32 are supported by their respective bridges 20, 30 so that gears attached to motor output shafts engage a drive rack 34 which extends in the x direction the length of the table 12. On an opposite side of the table 12, the abrading/cutting station 10 includes a rail 36 which supports rotating wheels on the non-driven ends of the two bridges 20, 30. Controlled energization of the two motors 22, 32 causes independent back and forth movement of the bridges 20, 30. Collision avoidance of the tools mounted to these bridges 20, 30 while simultaneously abrading and cutting or scoring a piece of glass on the table is one principal feature of the exemplary system.

An abrading tool assembly 50 is mounted to the first tool bridge 20 and abrades a coating material from a region of the glass sheet 14 as the tool moves relative to the sheet. A scoring tool 60 is mounted to the second tool bridge 30 for scoring an already abraded region of the glass. As noted, some regions are abraded only. A motor 52 (FIG. 12) mounted within an abrading tool housing 54 moves the abrading tool 50 back and forth (in the y direction) along its bridge 20. A motor output shaft rotates a gear that engages a gear rack 56 extending along the length of the bridge 20. A motor 62 mounted within a cutting tool housing 64 moves the cutting tool by means of similar engagement with a gear rack 66 which extends across the bridge 30. The two motors 52, 62 are schematically depicted in FIG. 12 and are not visible in the FIGS. 1-3 depictions as they are hidden from view within the housings 54, 64. (FIG. 1A) A wiring harness 55 extends from a side of the table 12 to the abrading tool 50 and a wiring harness 57 extends from the side of the table 12 to the scoring tool 60. The controller 100 actuates or energizes the two motors 52, 62 via signals routed through these harnesses 55, 57 thereby moving the scoring tool and the abrading tool back and forth across the length of the two bridges 20, 30.

By co-ordinated energization of the two motors 22, 52 the controller 100 can cause the abrading tool 50 to traverse a path that is at an angle with respect to a table side. Similarly, through controlled energization of the motors 32, 62 the controller 100 moves the cutting tool along paths oblique to the table side. This allows the controller 100 to coordinate abrading and cutting of glass sheets 14 that are not square with respect to the table side.

Figure 10:
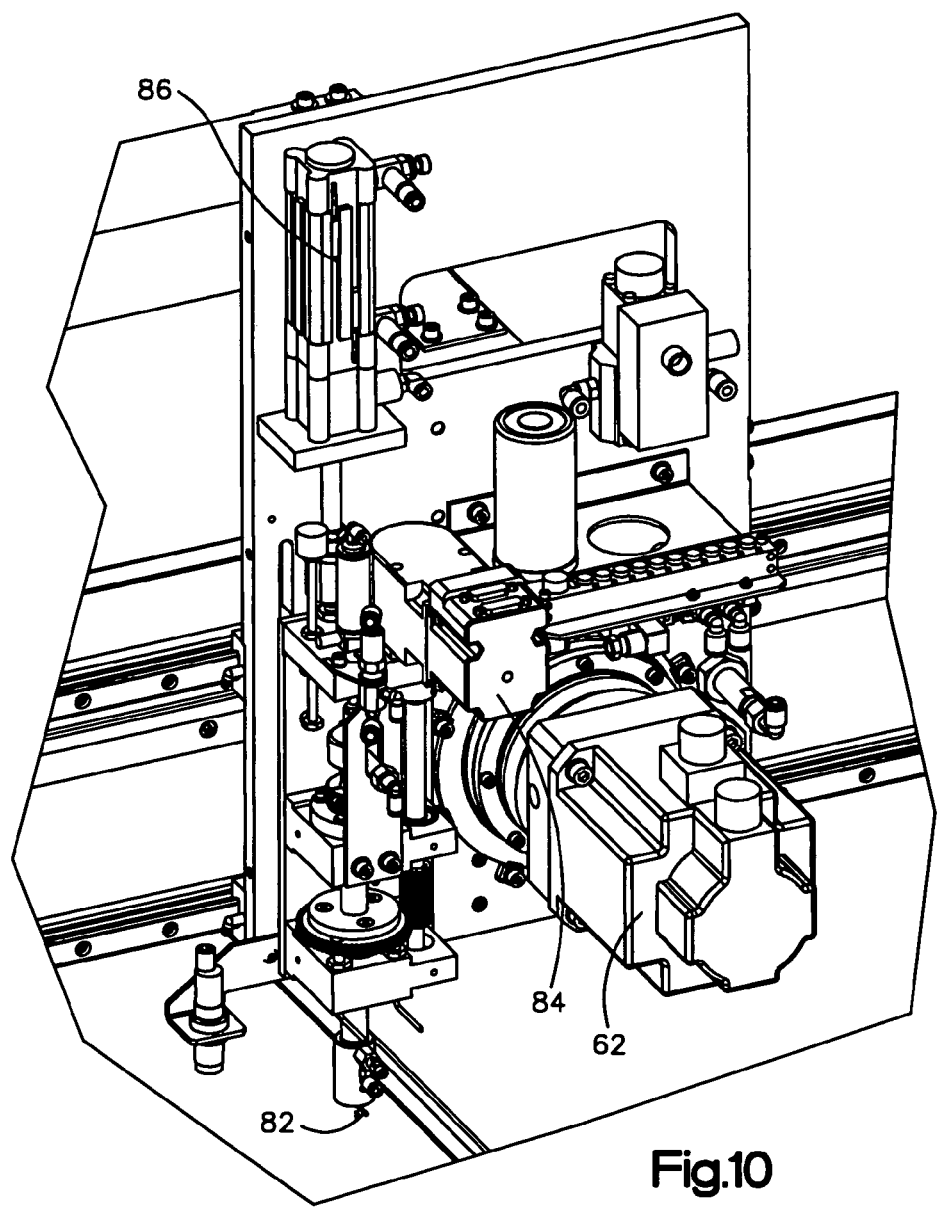
FIG. 10 is an enlarged perspective view of the scoring tool with a housing removed for purposes of illustration.

The exemplary scoring tool 60 includes a carbide cutting wheel 82 (FIG. 10) that is not driven but which rotates as the wheel is brought into contact with the glass and is moved along a controlled path of movement. The cutting wheel scores the glass sheet for later breakout of individual window or door lites. An actuator 86 brings the cutter into contact with the glass and controls the pressure applied by the cutting wheel against the glass as it moves along a scoring path. The scoring tool 60 can be rotated about a z axis (vertical in the illustrated exemplary embodiment) by a motor 84 which lines up the cutting wheel with the controlled scoring path. The scoring tool 60 can be rotated multiple complete revolutions.

Figure 4:
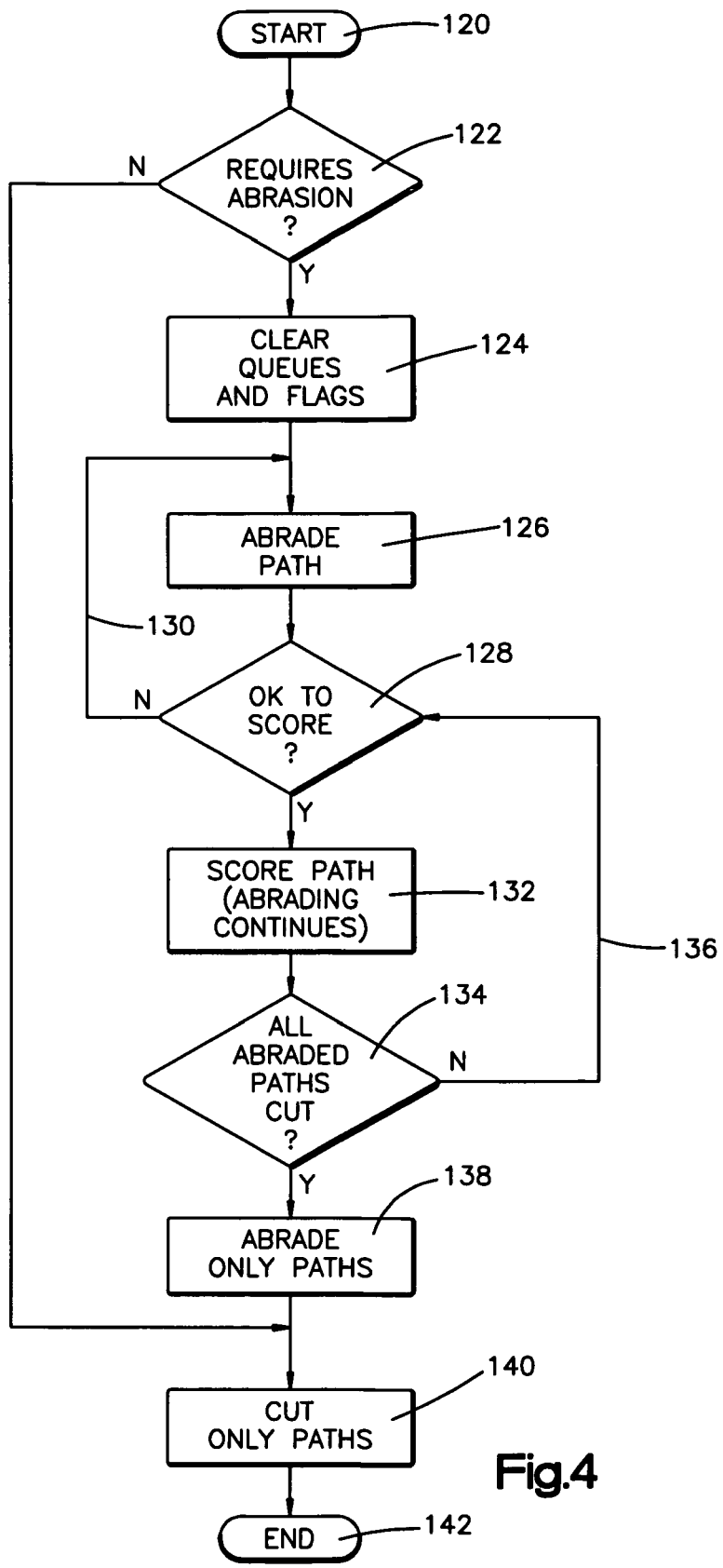
FIG. 4 is a flow chart of a control program for use in practicing the invention.
Figure 5:
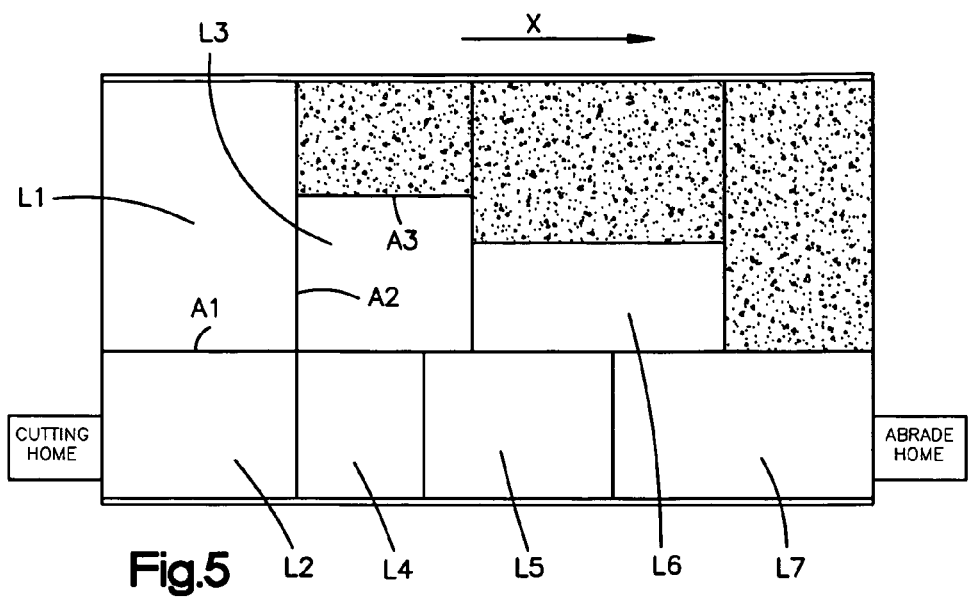
FIGS. 5-8 are schematic depictions of sheets of glass supported on a table for both abrading and cutting.

The controller 100 co-ordinates the relative movement of the first and second tool bridges 20, 30 to avoid contact between the first and second tool supports and their respective tools. A schematic of the controller 100 is depicted in FIG. 12 and a process flow chart is illustrated in FIG. 4. The controller 100 is programmed with software which causes the abrading and cutting tools to score glass sheets to form window or door lites in as efficient manner as possible without collision. In accordance with one process the control causes the abrading tool to abrade along one or more paths to remove a layer of material from the glass sheet 14, for example, until a separation between a cutting tool and an abrading tool at least a minimum separation. A flowchart for such software is depicted in FIG. 4. The minimum separation distance can change depending on the nature of the system such as the size of the tools as well as the speed with which the motors move the tools with respect to the table.

In accordance with the exemplary embodiment of the invention a minimum separation distance is determined based on the co-ordinates of the scoring and abrading paths. So long as the endpoint of the then current abrading path is less than a certain minimum separation distance from the start point of the next scoring path to be scored, no scoring of that path will occur. (Correct?) Alternative processes which are less conservative in maintaining a separation are possible. One specific alternative is that during controlled scoring of the sheet 14 at the station 10 a separation is monitored between the bridges 20, 30 by means of optical sensors coupled to the controller 100 for monitoring movement of the bridges with respect to the flat support surface 12. A second alternative, preferably accomplished with a stepper motor design, is to use the control signals sent to the motors 22, 32 to determine a distance moved by the two bridges 20, 30. Use of the stepper motor would allow bridge movement to be correlated with stepper motor control signals.

Emergency Shutdown

Figure 11:
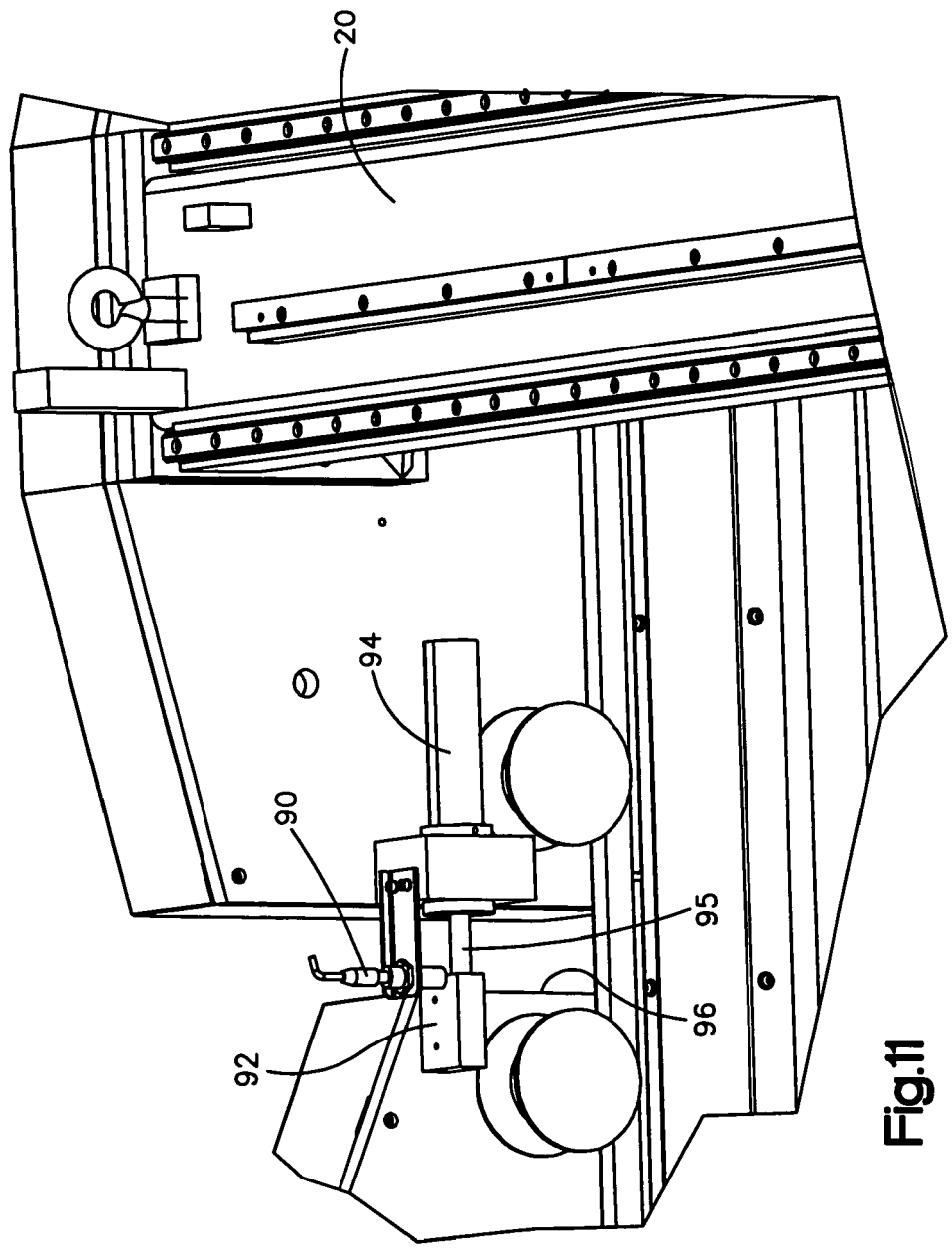
FIG. 11 is a side view showing an emergency shut down sensor for use with the exemplary system.

FIG. 11 illustrates an emergency shutdown system for deactivating all motors and bringing both bridges to an immediate stop before damage can be done to the tools 20, 30. To perform this safety feature, a proximity sensor 90 mounted to the bridge 20 monitors on a continual basis for the presence of a target 92 mounted to the second bridge 30. In the event a motor runs away or software situation allows the motors to bring the two bridges too close to each other, the sensor 90 will sense the existence of the target 92 and direct signals to overtravel imputs (OT+/OT−) of servo amplifiers coupled to the servo motors 32, 62 pending pressing by an operator of a reset button. Use of the overtravel inputs of the amplifiers is much faster than signaling the controller to shut down the motors in the event of an emergency. As an additional safety feature, the bridge 20 also supports a shock absorber 94 having a rod 95 extending from one end which contacts a facing surface 96 of a bumper on the bridge 30 to prevent damage. This use of a shock absorber is a mechanical safeguard to avoid damage in the event of a runaway situation. As seen in the perspective view of FIG. 1 and the side elevation view of FIG. 3, each of the bridges is equipped with bumpers at each end of the bridge so that even in the event the emergency shut down and shock absorber fail, contact between the bumpers would occur before contact between the cutting or abrading tool would occur.

Once the controller 100 determines such a minimum separation is achieved based on starting and ending points of the controlled paths, the controller 100 can initiate simultaneous abrading by the abrading tool to remove material from additional paths and cutting or scoring by the cutting tool to score a previously abraded path. Abrading, then scoring is a preferred method, but an alternative method is to score or cut first and then abrade away material.

Consider the following example wherein multiple lites L1-L7 (FIGS. 5-8) are cut from the sheet 14 supported on the table. An additional area at the upper right portion of the sheet 14 shown in these figures contains three scrap pieces that are discarded after cutting. In production, the patterns to satisfy a particular customer order vary from glass sheet to glass sheet. The exemplary process works for different patterns of lite sizes and shapes so that the process is robust in a sense that it can handle such variations in lite requirements in a heuristic way.

The control process of the exemplary system starts 120 (FIG. 4) by determining 122 if glass that should be abraded is present on the table. The controller 100 knows the various jobs that are being processed at the abrading/cutting station 10 and in particular knows which sheet in a sequence of sheets is placed on the table 12. The controller also knows the pattern of paths that must be scored for each sheet of glass that arrives at the station 10. In accordance with the invention the timing or sequencing at which those paths are scored is controlled in real time based on monitored conditions as abrading and scoring take place.

Assume coated or emissive glass has been placed on the table. At a next step 124 the controller 100 clears a table of queues and a status flag. The status flag provides an indication when the separation between bridges is large enough to simultaneously abrade with the tool 50 and to cut with the tool 60.

The abrading bridge 20 starts at a home position in the East (maximum x position) and travels in a negative x direction (West) to start the process of abrading paths. References to 'East' and 'West' are used to indicate directions of bridge travel in the following example. The control 100 finds the closest end point, (for either a horizontal or a vertical path not yet abraded) in a pattern of paths stored by the control 100. In finding the "closest" end point of a segment the control 100 compares the possible choices (not yet abraded paths) to the present position of the abrading tool. Choosing the closest end point results in the least off glass movement of the tool 50 from the completion of a previously abraded path to the start of the next path, minimizing cycle time for processing a sheet of glass for deleting and cutting.

In the example of FIGS. 5-8 below, the abrading tool starts at its home position so that it will initially travel East to West (West Bound). The controller 100 causes a path A1 to be abraded at the step 126. When a move is made, a list of moves queue (Table 1 below) is updated. The queue is split between directions of travel. There is a West Bound Queue and an East Bound Queue. After the first move, the state of the Travel Queue is depicted in Table 1. In this and the other tables, the letter "A" is used to indicate an abrade step.

TABLE 1

| WEST BOUND | EAST BOUND |
| --- | --- |
| A1 | |

The Cutting Bridge starts at its home position in the WEST and can only begin cutting by moving EAST (positive x). The control 100 determines in step 128 if the cutting tool 60 can be moved by checking the status flag. The two states for this status flag are shown in table 2. The control 100 must wait before initiating cutting until the status flag is set in response to an adequate distance between the two bridges 20, 30, taking into account the end point of the scoring vector and distance.

TABLE 2

| CONTROL FLAG | STATE |
| --- | --- |
| Clear to Cut | 1 = bridge past min distance<br>0 = Wait, cannot move |

The controller 100 knows where the abrading bridge is located (its x coordinate) because it knows the abrading path just completed by the bridge. If the separation between bridges exceeds a minimum bridge Clearance S, then the Clear to Cut flag is set by the control 100 and the Cutting Bridge is set in motion for cutting. The status flag must be set for the cutting bridge to move in preparation for its next cut. (Minimum distance S from end of cut vector)

In the example depicted in FIGS. 5-8, the abrading bridge 20 finishes its first move A1 near the cutting bridge. The appropriate minimum separation between bridges is therefore not achieved so that the status flag is not set so a test 128 fails. (Clear to Cut=0) Since cutting is not allowed, another path is abraded. The control software that implements the control process of FIG. 4 knows where the abrading tool stopped, and looks for the next closest path end point (top or bottom, left or right to perform minimum off glass movement of the tool to a non-abraded path) at which to start the next abrading step.

The next abrading path chosen based on the closest starting point is A2. The abrading tool 50 is moved along this path A2 and the travel queue is updated. Since the abrading bridge has traveled East from its last end point, the EAST BOUND queue is updated.

TABLE 3

| WEST BOUND | EAST BOUND |
| --- | --- |
| A← 1 | |
| | A ↑2 |

After the move A2, the minimum distance S for cutting as determined by a status flag test 128 still fails so cutting is not allowed and the abrading move A3 is made and the travel queue is updated as seen in Table 4.

TABLE 4

| WEST BOUND | EAST BOUND |
| --- | --- |
| A← 1 | |
| | A ↑2 |
| | A→ 3 |

After the move A3 has been completed, the abrading Bridge has cleared the minimum distance S for the cutter to finish its first cutting move with clearance S, the Clear to Cut flag is set by the control 100 so the Cutting Bridge can start cutting.

Figure 6:
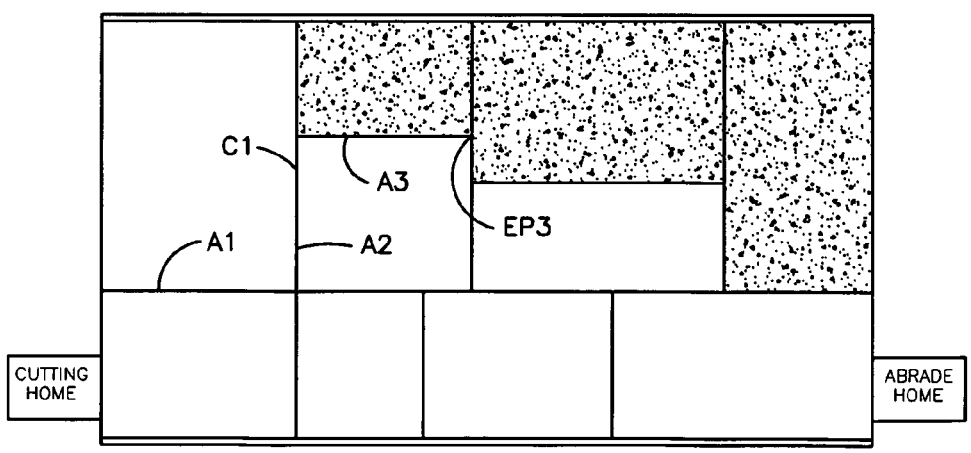
Figure 7:
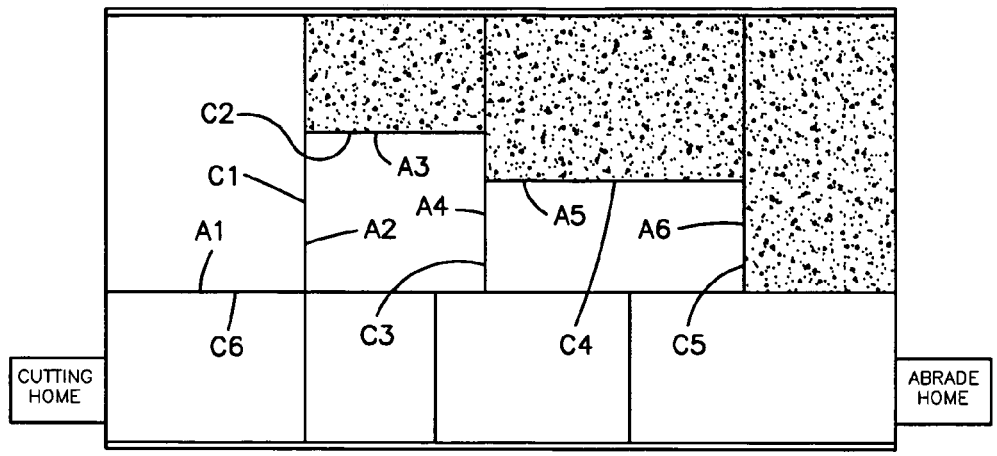
Figure 8:
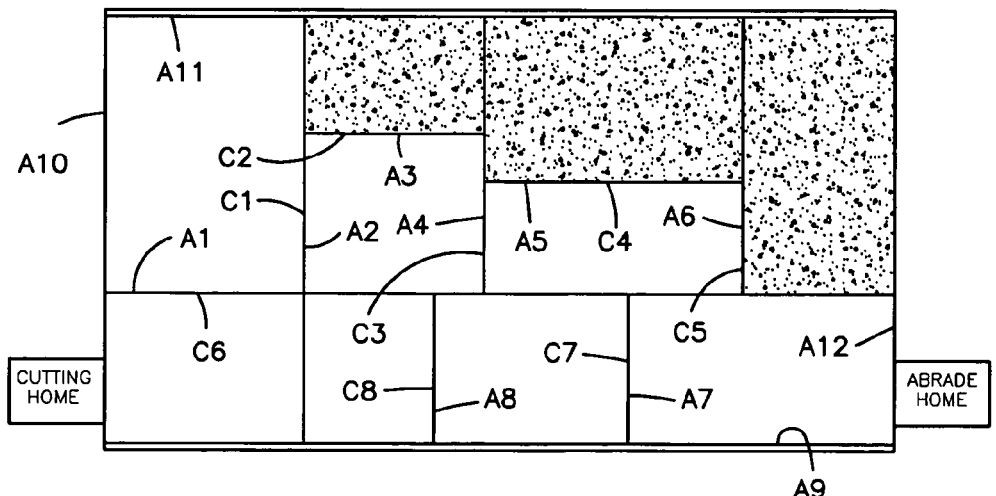
Figure 9:
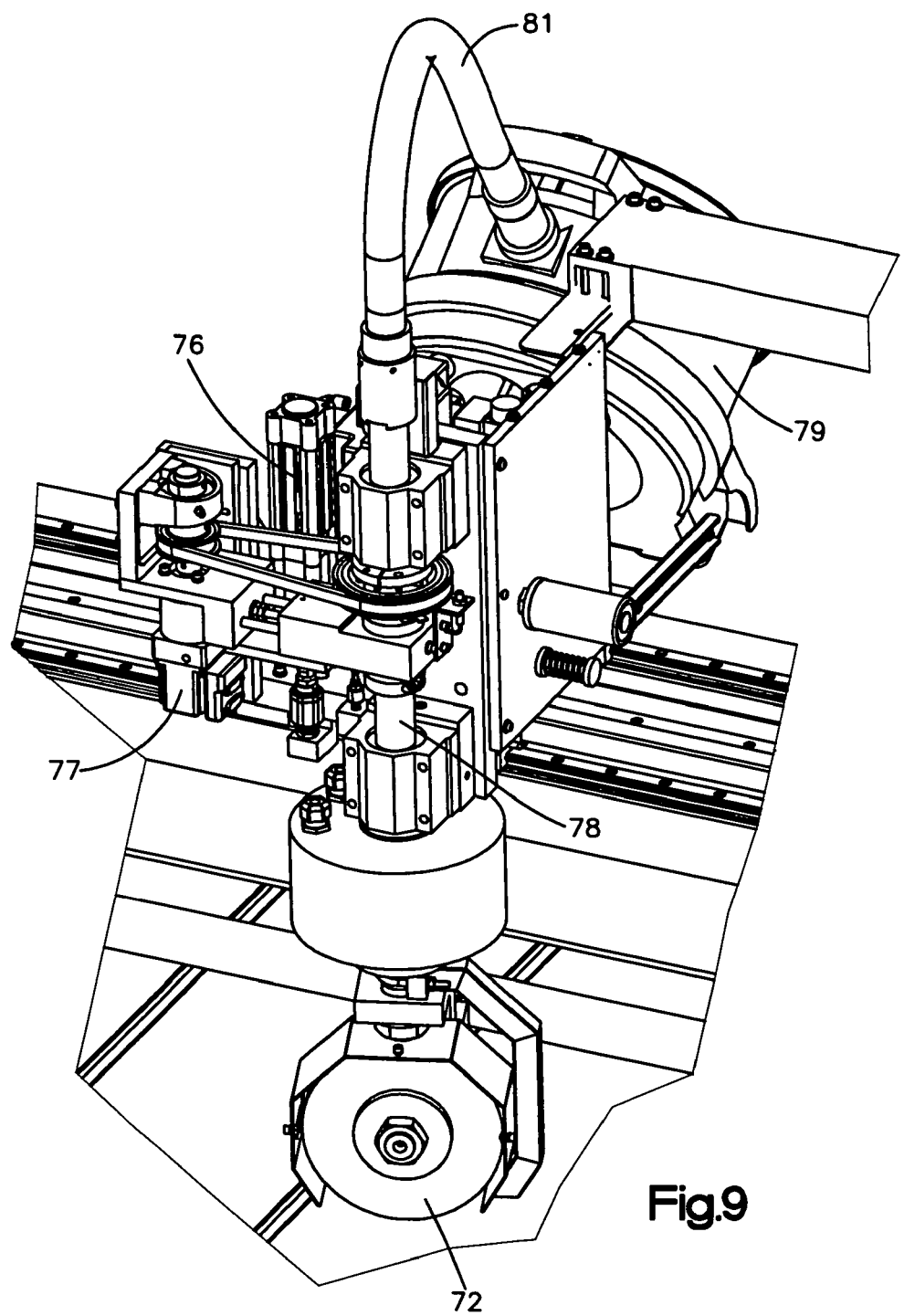
FIG. 9 is a is an enlarged perspective view of the abrading tool of FIG. 1A with a housing removed for purposes of illustration.

By referring to FIG. 6, one sees that after the move A3, the abrading tool 50 is located at an endpoint EP3. The distance between this end point EP3 and the cutting bridge home position exceeds the distance S. The controller 100 has two choices for a cut path for the cutting tool. The process programmed into the software initially cuts from West to East by choosing cut paths from the East bound queue of Table 4. A2 is chosen since the present exemplary system always cuts paths added to the queue in the order they are entered. Furthermore, the controller 100 only cuts a path if the entire cut path maintains adequate tool separation between the two tools 50, 60. This determination is based on the end point closest to the cutting bridge of the then current abrade path that is has been abraded and the entire score path of a possible next score path. This is a conservative approach to avoiding collisions. An alternative approach for maintaining minimum separation is to monitor an actual separation between the gantries on a real time basis as the paths are being traversed by the two bridges 20, 30. Such a real time monitoring of bridge position would not depend on path end points.

When adequate separation is determined, the controller 100 adds an entry to the EAST BOUND queue, and produces the cutting move C1. The cut move is listed in the table next to the abrade path that the cutting tool cut. Simultaneously, the abrading bridge takes its next move using the closest point to start rule moving left to right as A↓4.

TABLE 5

| WEST BOUND | EAST BOUND |
|---|---|
| A← 1 | |
| | A ↑2, C1 |
| | A→ 3 |
| | A ↓4 |

At the end of a cutting move, the control 100 determines the distance it needs to travel to the starting point for its next cut (next cut in the East bound queue) and calculates if it has enough room to proceed based upon the state of the clear to cut flag. If the bridge does not have enough clearance to go to the starting point of the next score path, the controller 100 will position itself to move forward into the starting position, and then wait for the clear to cut flag to be set.

The controller 100 continues to cycle through this repeated sequence of calculating and processing the next cut path and starting point for a next most efficient abrading path to abrade.

The cutting algorithm continues as well, processing the EAST BOUND Queue and then moving back to its Home position by processing the WEST BOUND Queue.

TABLE 6

| WEST BOUND | EAST BOUND |
|---|---|
| A← 1, C6 | |
| | A ↑2, C1 |
| | A→ 3, C2 |
| | A ↓4, C3 |
| | A→ 5, C4 |
| | A ↑6, C5 |
| | Abrade Home |

Note, so long as the abrading tool is in its home position, the scoring tool is permitted to cut or score the path C6, which would otherwise violate the minimum separation requirement S for cutting. (correct?) Table 7 below illustrates the next abrading and cutting moves.

TABLE 7

| WEST BOUND | EAST BOUND |
|---|---|
| A← 1, C6 | |
| | A ↑2, C1 |
| | A→ 3, C2 |
| | A ↓4, C3 |
| | A→ 5, C4 |
| | A ↑6, C5 |
| | Abrade Home |
| A ↑7, C7 | |
| A ↓8, C8 | |
| | Cutting Home |

After the last Cut C8, the cutting bridge goes to the Cutting Home position.

Abrade only paths are then processed 138 at the end. Since no additional cutting is required on this sheet, the last abrade paths are not recorded into the queue.

The following abrade moves are executed to finish the perimeter: A←9, A↑10, A→11, A↓12, Abrade Home.

In some cases, such as single strength glass (0.090" thick), experience indicates it is preferable to abrade the perimeter first (A9-A12 above) in order to avoid breaking out the glass with the abrading tool. In accordance with an exemplary process, after the sheet is abraded and cut, the glass sheet 14 is transferred to a break out station. Special cases and exceptions: Shapes: All cut shapes excluding rectangles are processed sequentially. The pattern is abraded separately, and then cut separately, so that no simultaneous bridge motion occurs in these situations. (to avoid bridge interference)

Control Schematic

FIG. 12 shows the interrelation between the controller 100 and the servo motors discussed above. The controller 100 responds to commands from a user interface computer 102 through which the user can control operation of the station 10. The user interface computer 102 receives cutting patterns from a master computer (not shown) by means of a network connection (not shown) and can display the pattern on a viewing monitor. Once a sequence of cutting and abrading moves are determined, this pattern of moves is sent to the controller 100 for use in the controlled movement of the gantries while selectively simultaneously abrading and scoring certain paths, abrading only other paths, and sequentially abrading and scoring certain irregularly shaped paths.

As noted above, the station has a built in safety feature for shutting down the motors in the event an overtravel condition exists. Certain servo amplifiers for driving the servo motors depicted in the drawing have ± overtravel inputs which cause the motors to stop. These same servo amplifiers have home inputs which when active cause the servo to drive the respective gantry or tool to its home position. Certain machine inputs 106 and outputs 108 include an ability to command (via an output) an automatic glass delivery machine and inputs would include, for example, an input indicating the glass loader is ready to deliver glass to the cutting station 10.

The control schematic of FIG. 12 also depicts pressure regulators 76a, 86a which provide electric signals to the controller indicative of the pressure contact of the abrading and cutting tools respectively. The actuator 86 forces the cutting tool 82 against the glass with a controlled pressure to score the glass as controlled actuation of the motors 32, 62 moves the cutting tool across a controlled path on the surface of the glass. Similarly the actuator 76 forces the abrading tool 72 across a controlled path. During such movement each tool may encounter uneven surfaces which causes the pressure to change. In response to such unevenness the regulators 76a, 86a provide a feedback signal directly proportional to pressure which is interpreted by the control 100 and used to adjust actuation of the respective actuations 76, 86.

Another feature highlighted by the FIG. 12 schematic is use of a feedback system that monitors the diameter of the abrading wheel to control its speed of rotation so that as the abrading wheel wears with use and is periodically reshaped (see below), its speed of movement with respect to the glass remains relatively constant. Assume the speed of rotation of the abrading wheel provided by the AC motor 74 can be expressed as an angular velocity $W_m$. As the abrading wheel rotates the instantaneous speed of movement of that portion in contact with the glass is called surface speed SS. In equation form, $SS=W_m * \pi D$ where D is the diameter of the abrading wheel. At periodic intervals during use of the wheel, the controller 100 causes the actuator 76 to bring the wheel 72 into contact with a glass sheet. A linear encoder 104 mounted within the actuator 76 feeds back a signal related to the diameter of the wheel. To maintain a specified surface speed, SS the controller adjusts the speed of rotation of the motor 74 in terms of revolutions per minute to maintain a desired surface speed.

Figure 1A:
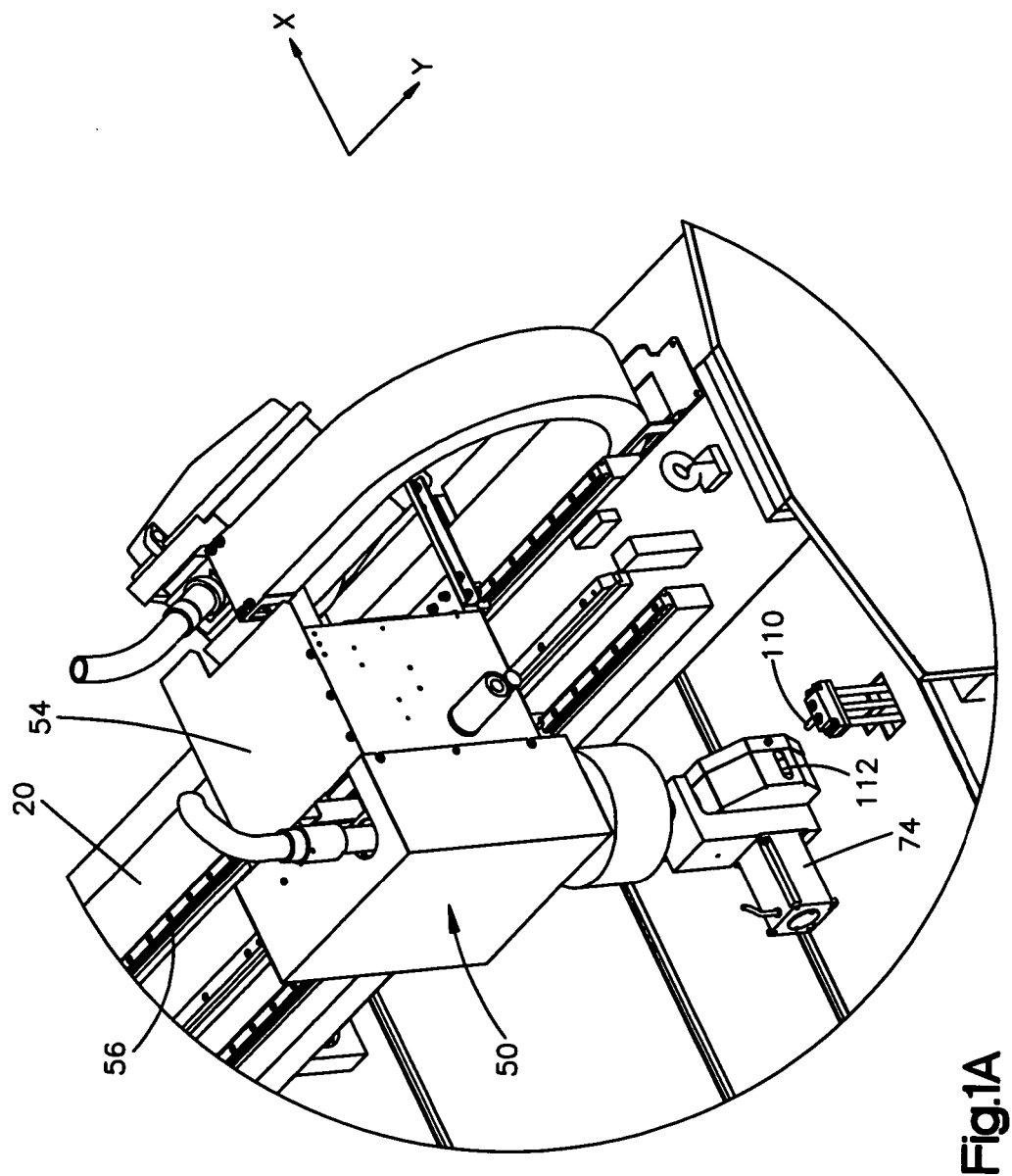
FIG. 1A is an enlarged perspective view of an abrading tool for selectively abrading a coating from paths on sheets of glass.

Turning to FIG. 1A, the station 10 also includes a dressing tool 110 that is mounted for movement from an out of the way position beneath the support 12 to a position wherein the tool is movably located to the position shown above a top surface. The dressing tool 110 does not move in the X-Y plane. The motor 22 is activated to move the wheel 72 back and forth in the x direction under control of the controller 100 to restore a desired shape to the wheel. In accordance with the exemplary embodiment the wheel 72 is most preferably a thin (approx 1 inch) cylinder with a cylindrical abrading surface. This shape is distorted with use due to abrading on perimeter portions of glass where the wheel 72 only contacts part of the glass. The controller 100 keeps track of the amount of usage of the wheel 72 and at periodic intervals the controller brings the wheel 72 into contact with the dressing tool 110 by appropriate activation of the y axis motor 52 while moving the wheel back and forth. In accordance with the exemplary embodiment the usage is monitored in terms of the lengths of the paths that have been abraded, but it is appreciated other measures of use such as time of operation or number or glass sheets abraded could be used to decide when to redress the wheel 72. To accommodate such contact, a slot 112 in a side of the tool housing makes the wheel 72 accessible to the dressing tool without disassembly of the tool housing. A preferred abrading wheel 72 is made of silicon carbide material. The dressing tool is a diamond tipped tool suitable for redressing the wheel 72.

The process summarized in the flow chart of FIG. 4 is a presently preferred process but other alternative processes are envisioned. Two of these alternatives are summarized. Assuming the same physical layout of the station 10, listings 1 and 2 below are pseudocode for these alternatives.

Listing 1

Start at Origin $X_0$, $Y_0$
1. If edge deletion complete through X and Ahead by $D_{min}$ then cut Vertical Segment staring from shortest off glass move.
2. Move (Left to Right) across X, Delete first vertical segment choosing closest starting point.
3. Moving (top to bottom), delete horizontal segments left to right
   a. simultaneously if segment is less than $D_{min}$ cut horizontal in chase
   b. recursively repeat 2 until all horizontals completed
4. Move to next closest vertical segment across x then go to step 1.

The method summarized in listing 1 achieves a goal of no deletion over a previously cut segment.

Listing 2

Start at Origin $X_0$, $Y_0$
1. Moving (top to bottom) through Y, delete and chase cut all horizontals if $D_{min}$ is exceeded. If not, then process lines independently.
2. Moving (left to right) delete vertical segments. Between move, move to next segment using the shortest distance between.
3. If deletion bridge is greater than $D_{min}$ away, cut vertical segments moving left to right.

Note, the method of listing 2 allows the deletion wheel to pass through the intersections where cutting oil from a prior scoring step on the same glass sheet has occurred.

It is appreciated that although a detailed description of a preferred exemplary embodiment of the invention has been described with a degree of particularity, it is the intent that the invention include modifications and alterations such as the two alternatives summarized above differing from the disclosed design falling within the spirit or scope of the appended claims.

The invention claimed is:

1. In a system for scoring glass sheets to form window or door lites, a method comprising:
   moving a first tool along one or more paths to treat a surface of a glass sheet;
   monitoring a separation between a second tool positioned with respect to the glass sheet and said first tool as the first tool moves along said one or more paths; and
   after a minimum separation is achieved, moving both the tools to treat the glass sheet along controlled paths on said surface;
   wherein at least one of said tools comprises a scoring tool for separating the glass sheet into lites.

2. The method of claim 1 wherein the first and second tools are an abrading tool and a scoring tool and additionally comprising maintaining a minimum separation between said scoring tool and abrading tool as the scoring tool and abrading tool simultaneously are moved to both abrade and score paths on the glass sheet.

3. The method of claim 2 wherein a controller stores a sequence of paths for first abrading and then scoring and calculates a distance between paths to monitor for said minimum separation to determine a suitability of initiating movement of the scoring tool in relation to the glass sheet.

4. The method of claim 1 wherein a controller is programmed with software which maintains a status flag based on real time sensed separation between the first and second tools and wherein the controller periodically checks the status flag to determine if tool movement can safely continue.

5. The method of claim 1 wherein the first tool is an abrading tool and the second tool is a scoring tool and further wherein a controller is programmed with software that maintains directional queues for maintaining a list of paths followed by said abrading tool in order to determine an order of scoring moves by the scoring tool once scoring of previously abraded paths is initiated.

6. The method of claim 5 wherein the monitoring of adequate separation is based on the distance between already abraded paths and unscored paths.

7. The method of claim 1 wherein the first tool is an abrading tool including a rotating wheel driven by a motor and wherein a controller changes an angular speed of rotation of said motor based on the size of the wheel.

8. The method of claim 1 wherein the first tool is an abrading tool including a rotating wheel and wherein a controller periodically re-shapes the rotating wheel based on an amount of use of said wheel in abrading paths on glass sheets.

9. The method of claim 2 wherein irregularly shaped paths not following linear paths are abraded and scored in turn without simultaneous movement of said tools separately from glass treatment of a set of linear paths at least some of which are abraded and cut simultaneously.

10. The method of claim 2 wherein a set of abrade only paths are abraded separately from a set of paths that are both abraded and scored.

11. A method for scoring glass comprising:
a) supporting a large sheet of glass on a glass support at a glass scoring station;
b) positioning a first tool support for controlled movement in relation to the glass support;
c) positioning a second tool support for controlled movement in relation to the glass support;
d) mounting an abrading tool to the first tool support for abrading a coating material from the glass;
e) mounting a scoring tool to the second tool support for scoring a region of the glass;
f) co-ordinating a movement of the first and second tool supports with respect to a piece of glass to both score and abrade controlled paths on the piece of glass while avoiding contact between the first and second tool supports or their respective tools.

12. The method of claim 11 wherein a control parks one of said first and second tool supports at a first end of the glass scoring station and wherein the control initially moves another of said first and second tool supports toward said first end of said scoring station and moves said another tool support along controlled paths while the one tool support is kept in a parked position until an adequate number of paths have been traversed to allow movement of said one support without contact between the first and second tool supports or their respective tools.

13. The method of claim 12 wherein the control initially causes the abrading tool to follow one or more controlled paths and then causes the scoring tool to follow a number of already abraded paths in the same order in which the abrading tool moves.

14. The method of claim 13 wherein the scoring tool follows the abrading tool as it moves in a given direction.

15. The method of claim 11 wherein the abrading tool is an abrading wheel and wherein a control changes a rotational speed of the abrading wheel based on the diameter of the abrading wheel.

16. The method of claim 11 wherein the abrading tool is an abrading wheel and wherein a control periodically reshapes the abrading wheel.

17. The method of claim 16 wherein the control period at which the control reshapes the abrading wheel is based on number of glass sheets treated, time of service of said abrading wheel or distance of paths treated by said wheel.

18. The method of claim 11 wherein a control monitors a pressure between the abrading tool and the scoring tool and adjusts movement of the abrading and scoring tools to maintain said pressure as each tool encounters variations in a glass surface being treated.

19. A system for scoring glass comprising:
a) a glass support for supporting a sheet of glass at a glass scoring station;
b) a first tool support mounted in relation to the glass support and including a first drive for moving the first tool support relative to the glass support;
c) a second tool support mounted in relation to the glass support and includes a second drive for moving the second tool support relative to the glass support;
d) an abrading tool mounted to the first tool support for abrading a coating material from the glass;
e) a scoring tool mounted to the second tool support for scoring the glass; and
f) a controller that activates the first and second drives to move the first and second tool supports while avoiding contact between the first and second tool supports and their respective tools.

20. The system of claim 19 wherein the controller determines a separation between said tool supports, and said controller inhibits movement of said second tool support until a separation between said first and second tool supports is greater than a minimum distance deemed adequate to avoid contact as a controlled path of travel is traversed in response to energization of the second drive.

21. The system of claim 19 wherein the abrading and scoring tools are rotatably mounted to rotated about a generally vertical axis to contact the glass along controlled paths with respect to said glass support.

22. The system of claim 19 wherein the controller maintains a space between the first and second tool supports to avoid collisions.

23. The system of claim 19 wherein the first and second tool supports comprise gantries that extend across said table and additionally comprising first and second tool motors for moving the tools relative to a respective gantry wherein independent actuation of the first and second drives and said first and second tool motors provides controlled paths of abrading and scoring at selected angles with respect to the glass support.

24. The system of claim 19 additionally comprising an emergency sensor for shutting down said drives in the event a separation between the first and second tool supports is less than a threshold separation.

25. The system of claim 24 additionally comprising a shock absorber mounted to one of said first and second tool supports in position to engage a surface of another of said first and second tool supports when the tool supports move past the threshold separation.

26. The system of claim 19 wherein the controller is programmed to maintain a list of abraded paths and then begins the scoring along the paths that have been abraded once a minimum separation between the tool supports is determined and further wherein the scoring paths follow the same order as the abraded paths.

27. The system of claim 19 wherein the abrading tool is an abrading wheel and additionally comprising a feedback device for determining its diameter for use by the controller is adjusting an angular speed of rotation of said abrading wheel.

28. The system of claim 19 wherein the abrading tool is an abrading wheel and additionally comprising a reshaping tool for reshaping said abrading wheel and wherein the controller periodically causes the reshaping tool to reshape the abrading wheel.

29. The system of claim 28 wherein the reshaping tool is movable from a position beneath a supporting surface of the glass support to a position above the supporting surface of said glass support.

30. The system of claim 28 wherein the controller reshapes the abrading wheel based on usage of said wheel.

31. The system of claim 28 wherein the controller monitors the length of abrading paths that have been abraded to determine when to reshape said abrading wheel.

32. The system of claim 19 wherein the controller monitors a pressure between the scoring tool and the abrading tool as said tools treat a surface of a glass sheet and further wherein a pressure applied to said sheet is adjusted in response to the monitoring of said pressure.

33. In a system for scoring glass having a glass support for supporting a sheet of glass at a glass scoring station and including a scoring tool mounted to a scoring tool support for scoring the glass, apparatus comprising:
   a) an abrading tool support that extends across the glass support;
   b) a first drive for moving the abrading tool support relative to the glass support;
   c) an abrading wheel mounted for rotation to the first tool support for abrading a coating material from the glass;
   d) a second drive for moving the abrading wheel along an extent of said abrading tool support;
   e) a motor for rotating the wheel at a controlled rate of rotation;
   f) an encoder for determining a diameter of the abrading wheel; and
   g) a controller coupled to the first and second drives for activating the first and second drives to move the abrading wheel relative to the glass support to abrade a material coated on a glass sheet and additionally coupled to the motor for energizing the motor to rotate said abrading wheel at a controlled rate based on a sensed diameter of said abrading wheel.

34. In a system for scoring glass having a glass support for supporting a sheet of glass at a glass scoring station and including a scoring tool mounted to a scoring tool support for scoring the glass, apparatus comprising:
   a) an abrading tool support that extends across the glass support;
   b) a first drive for moving the first tool support relative to the glass support;
   c) an abrading wheel mounted for rotation to the abrading tool support for abrading a coating material from the glass;
   d) a second drive for moving the abrading tool along an extent of said abrading tool support;
   e) a motor for rotating the wheel at a controlled rate of rotation;
   f) a dressing tool for contacting the abrading wheel at periodic intervals to reshape said abrading wheel; and
   g) a controller coupled to the first and second drives for activating the first and second drives to move the abrading tool relative to the glass support to abrade a material coated on a glass sheet and additionally coupled to the motor for energizing the motor to rotate said abrading wheel at a controlled rate and further wherein the controller brings the abrading wheel into contact with the dressing tool by controlled actuation of said first drive to periodically reshape said wheel based on use of said wheel that is monitored by said controller.

35. The system of claim 34 wherein the dressing tool is mounted for movement from a position beneath the glass support to an operative position above the glass support for contacting the abrading wheel.

36. The system of claim 34 wherein the controller moves the abrading wheel against the dressing tool by energization of said first and second drives.

37. The system of claim 34 wherein use of the wheel is judged by the controller based on the length of paths abraded by said wheel.

* * * * *